(12) United States Patent
Maiman et al.

(10) Patent No.: US 10,891,531 B1
(45) Date of Patent: Jan. 12, 2021

(54) TEAR ELEMENT FOR MAGNETIC STRIPE OF TRANSACTION CARD

(71) Applicant: Capital One Services, LLC, McLean, VA (US)

(72) Inventors: Tyler Maiman, Melville, NY (US); Brendan Way, Brooklyn, NY (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/809,149

(22) Filed: Mar. 4, 2020

(51) Int. Cl.
G06K 5/00 (2006.01)
G06K 19/077 (2006.01)
G06K 19/06 (2006.01)

(52) U.S. Cl.
CPC ..... *G06K 19/077* (2013.01); *G06K 19/06196* (2013.01)

(58) Field of Classification Search
CPC ........... G06K 19/077; G06K 19/06196; G06K 19/07701
USPC ....................................................... 235/380
See application file for complete search history.

(56) References Cited

U.S. PATENT DOCUMENTS

| 7,370,805 | B2 * | 5/2008 | Smith ..................... G07F 7/086 235/383 |
| 7,658,371 | B2 * | 2/2010 | Deschryver ............ B31D 1/027 270/21.1 |
| 7,753,262 | B2 * | 7/2010 | Kingsborough ..... B42D 15/045 235/380 |
| 8,328,106 | B1 * | 12/2012 | Trujillo ................ G06K 19/041 235/449 |
| 9,076,090 | B2 * | 7/2015 | Anzalone ............. G06K 19/041 |
| 10,628,724 | B1 * | 4/2020 | Adcock ........... G06K 19/06187 |
| 2004/0256469 | A1 * | 12/2004 | Faenza, Jr. ............. G06K 19/08 235/492 |
| 2005/0220377 | A1 | 10/2005 | Hanus |
| 2014/0262903 | A1 | 9/2014 | Mitten et al. |
| 2020/0110976 | A1 * | 4/2020 | Benkreira .......... G06K 19/0723 |

\* cited by examiner

*Primary Examiner* — Ahshik Kim
(74) *Attorney, Agent, or Firm* — Kacvinsky Daisak Bluni PLLC

(57) ABSTRACT

Provided are approaches for deactivating an identification chip of a transaction card using a tear element. In some approaches, the transaction card may include a body, the identification chip coupled to the body, and the tear element disposed between the identification chip and the body. The tear element is operable to decouple the identification chip from the body when the tear element is pulled or otherwise moved away from the body.

20 Claims, 7 Drawing Sheets

500

501
Providing a Body of a Transaction Card, the Body Including an Interior Structure

503
Providing an Exterior Layer Over the Interior Structure, Wherein the Exterior Layer Includes a Magnetic Stripe

505
Providing a Tear Element Between the Magnetic Stripe and the Interior Structure

507
Separating One or More Portions of the Magnetic Stripe from the Interior Structure by Drawing the Tear Element Away from the Second Main Side of the Body

FIG. 9

TEAR ELEMENT FOR MAGNETIC STRIPE OF TRANSACTION CARD

FIELD

Embodiments of the present disclosure relate to transaction cards and, more particularly, to transaction cards including a tear element.

BACKGROUND

Transaction cards, such as credit cards and debit cards, typically contain account information such as the account number, owner's name, and expiration date. This information may be provided in different formats, and at different positions along the card. In one format, text is embossed into or printed on the plastic of the card for use visually. In a second format, a magnetic stripe containing the information in a computer-readable form may be provided along the back of the card. In a third format, information is contained on an identification chip coupled to the front of the card. When the card is no longer useful, such as after the card is expired or is cancelled, it is desirable to destroy the information recorded on the card for security reasons.

The current approach for destruction of plastic cards is to cut the card into a number of small pieces so that it is difficult to reconstruct the data from the pieces. However, this process can be laborious. Furthermore, with some types of cards, such as with metal cards, typical destruction methods are not easily achieved. Thus, it would be desirable to have approaches for physically destroying the magnetic stripe of the card.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card, may include a body including an interior structure, and an exterior layer attached to the interior structure, the exterior layer including a magnetic stripe. The transaction card may further include a tear element disposed between the magnetic stripe and the interior structure, wherein the tear element is operable to tear the magnetic stripe when the tear element is moved away from the body.

In another approach according to the disclosure, a transaction card may include a body including a first main side opposite a second main side, and an exterior layer along the second main side, the exterior layer including a magnetic stripe. The transaction card may further include a tear strip disposed between the magnetic stripe and an interior structure of the body, wherein the tear strip is operable to tear through the magnetic stripe when the tear strip is moved away from the body.

In yet another approach according to the disclosure, a method may include providing a body of a transaction card, the body including an interior structure, and providing an exterior layer over the interior structure, wherein the exterior layer includes a magnetic stripe. The method may further include providing a tear element between the magnetic stripe and the interior structure.

BRIEF DESCRIPTION OF THE DRAWINGS

The accompanying drawings illustrate example approaches of the disclosure, including the practical application of the principles thereof, as follows:

FIG. 9 illustrates a flowchart for performing methods in accordance with embodiments of the present disclosure.

Figure 1:
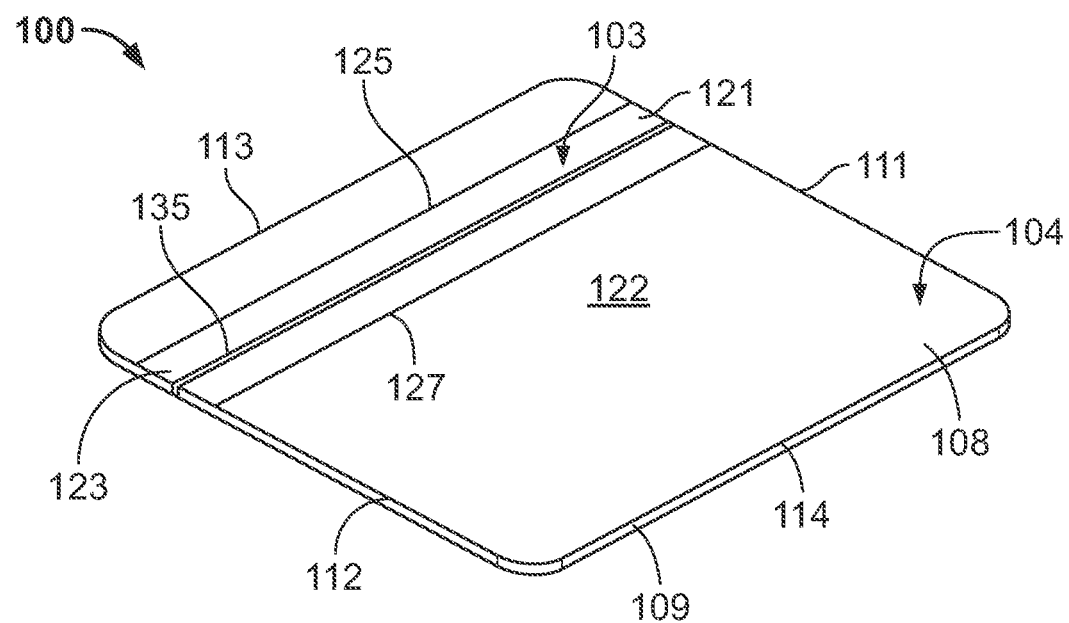
FIG. 1 is a perspective view illustrating a transaction card, in accordance with embodiments of the present disclosure.
Figure 2:
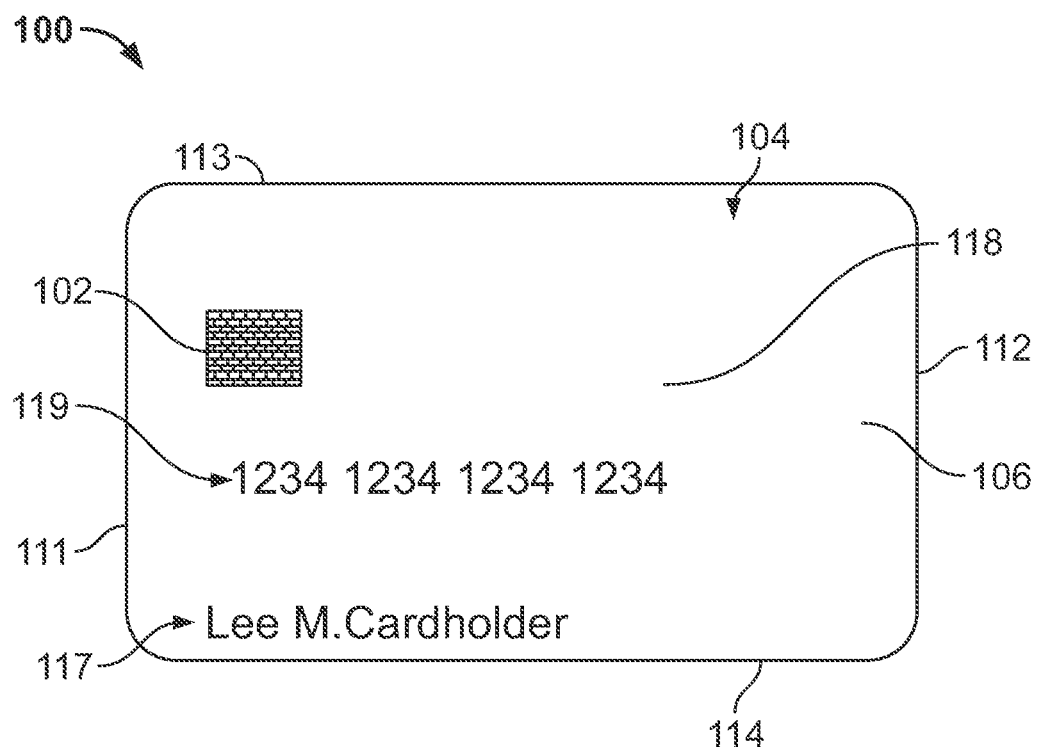
FIG. 2 is a top/front view of the transaction card of FIG. 1, in accordance with embodiments of the present disclosure.
Figure 3:
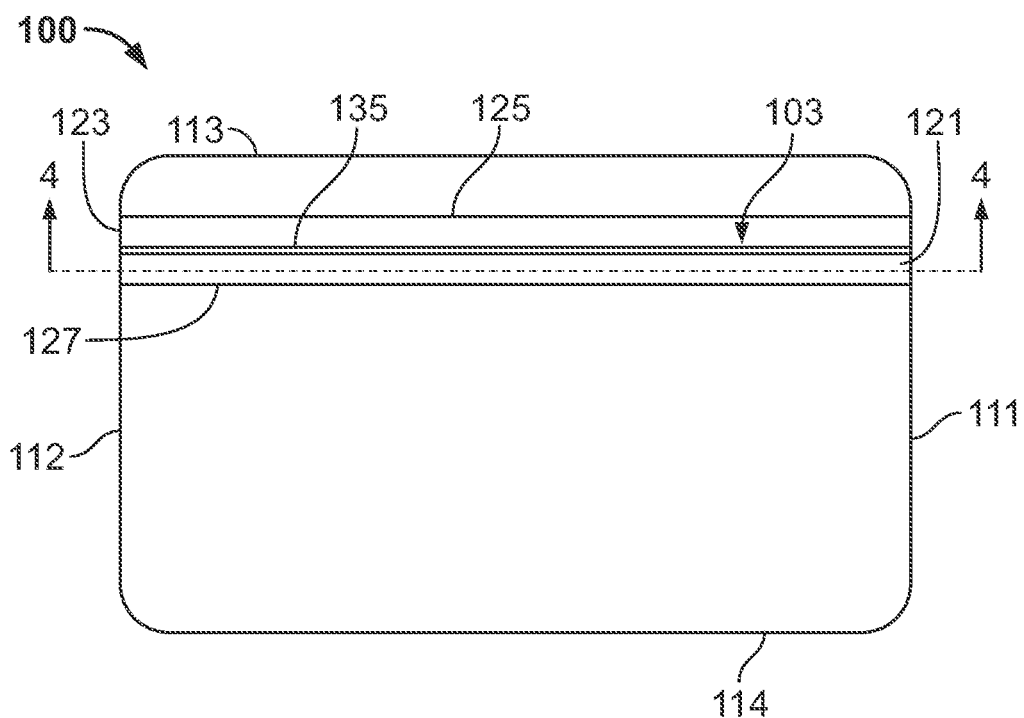
FIG. 3 is a bottom/back view of the transaction card of FIG. 1, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards including a magnetic stripe and a tear element operable to destroy and/or remove the magnetic stripe. The tear element may be located within the card structure, e.g., underneath the magnetic stripe. As the tear element is pulled or otherwise moved away from the card, the magnetic stripe may be torn or broken, thus rendering the magnetic stripe unreadable.

Referring now to FIGS. 1-4, an example transaction card (hereinafter "card") 100 according to embodiments of the disclosure will be described. The card 100 may be a credit or debit card, a RFID passport, or an access card. As will be described in greater detail herein, the card 100 may include multiple layers each having one or more functions. Although non-limiting, the card 100 may be made from polyvinyl chloride (PVC), polyester, or polycarbonate. Described sometimes herein as contactless due to the method of communication by an identification chip 102, such as an EMV chip, the card 100 may also provide one or more functions requiring contact. For example, the card 100 may include a magnetic stripe 103 and/or a microchip connected to contacts present on an outer layer of the card 100.

As shown, the card 100 may include a body 104 having a first main side 106 and a second main side 108 opposite the first main side 106. Although non-limiting, the first main side 106 may correspond to a front or top side of the card 100, while the second main side 108 may correspond to a back or bottom side of the card 100. The first main side 106 and the second main side 108 are joined by a side surface 109 extending around a perimeter of the body 104. The body 104 may further include a first end 111 opposite a second end 112, and a first side 113 opposite a second side 114.

In some embodiments, the magnetic stripe 103 may be provided on the second main side 108 of the body 104. In some embodiments, the magnetic stripe 103 is part of a second exterior layer 122. In other embodiments, the magnetic stripe 103 is part of a separate component or layer disposed atop or beneath the second exterior layer 122. The magnetic stripe 103 may include a first end 121 opposite a second end 123, wherein the first end 121 generally extends to the first end 111 of the body 104 and the second end 123 generally extends to the second end 112 of the body 104. The magnetic stripe 103 may further include and a first side 125 opposite a second side 127.

The magnetic stripe 103 may contain cardholder data in accordance with standard protocols. For example, in some embodiments, the magnetic stripe 103 includes three tracks, often designated as track 1, track 2, and track 3. Many payment cards, such as credit cards or debit cards, have a magnetic stripe that includes two tracks, such as a magnetic stripe that includes tracks 1 and 2. Other cards have a magnetic stripe that includes three tracks. Many card readers can read a magnetic stripe that includes three tracks, and in cases where the payment card includes a magnetic stripe with only two tracks, the card reader's ability to read a third track is unused. In non-limiting embodiments, when the magnetic stripe 103 is encoded with account data of the card 100 using two tracks, the account data of the card 100 can be encoded in tracks 1 and 2. Track 3 of the magnetic stripe 103 may be unused and devoid of valid data in such a situation.

Although not shown, the second main side 108 of the card 100 may include additional identifying indicia. For example, additional identifying indicia may include a card verification value (CVV), such as a 3-digit number. Depending on the type of card, the additional identifying indicia may be present on or near a signature strip.

In some embodiments, the second exterior layer 122 may be a polymer-based material, e.g., a polyester, polyvinylchloride (PVC), polypropylene, polyethylene, acrylic, polycarbonate, and/or like material. Although non-limiting, the second exterior layer 122 may be transparent. In other embodiments, the second exterior layer 122 may be formed of an acrylic resin (e.g., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer may be applied (or formed) by spraying, screen printing, painting, powder coating or any other like method, and cured (processed) by UV cure, electron beam curing, oven heat, or any radiation curing method or in any other suitable manner.

The card 100 may further include a tear element 135 positioned beneath the magnetic stripe 103. In other embodiments, the tear element 135 may be part of the magnetic stripe 103. As shown, the tear element 135 may be disposed between the body 104 and the magnetic stripe 103, wherein the tear element 135 is operable to break, tear, and or remove the magnetic stripe 103 when the tear element 135 is pulled, lifted, or otherwise moved away from the first main side 106 of the body 104. In some embodiments, the magnetic stripe 103 and/or the second exterior layer 122 may include a notch or a set of perforations (not shown) aligned over the tear element 135 to make it easier for the tear element 135 to move through the magnetic stripe 103 when pulled. It will be appreciated that the magnetic stripe may include any configuration or number of weakened portions, scores, and/or cuts to encourage the tear element 135 along an intended path through the magnetic stripe 103.

Although non-limiting, the tear element 135 may be a string, strip, thread, etc., of material configured to tear/move along a predetermined path. More specifically, the tear element 135 may be a cord, wire, string, yarn, fiber strand, filament, floss or any other type of elongated object that can be pulled to break or tear through the magnetic stripe 103. The tear element 135 may be straight or may form a pattern. The tear element 135 may be adhesive or non-adhesive. It will be appreciated that the tear element 135 may have a tensile strength great enough to tear through the magnetic stripe 103 without breaking. Although the tear element 135 is depicted as being visible, it will be appreciated that the tear element 135 can be hidden or partially hidden by the magnetic stripe 103.

Figure 4:
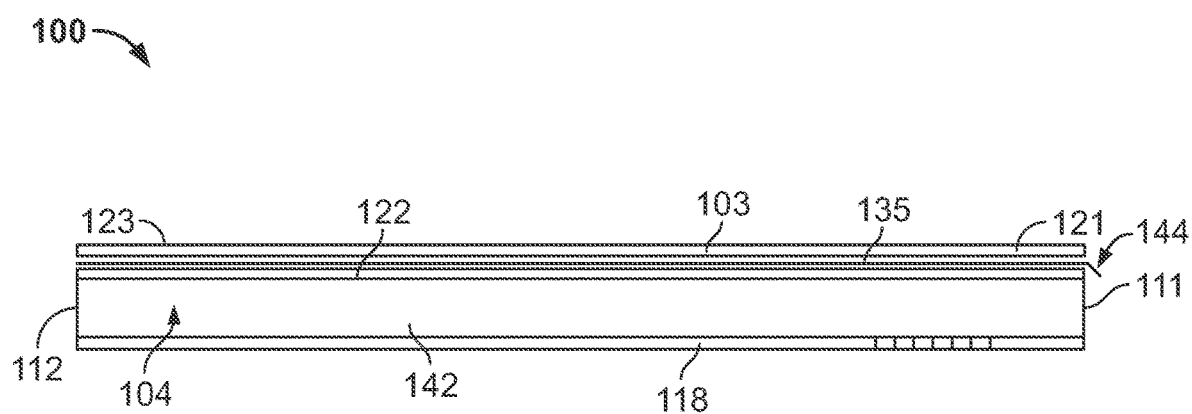
FIG. 4 is a side cross-sectional view of the transaction card of FIG. 3, in accordance with embodiments of the present disclosure.

As best shown in FIG. 4, the tear element 135 may be disposed between the second exterior layer 122 and the magnetic stripe 103, wherein the second exterior layer 122 may be formed directly over an interior structure 142 of the body 104. In some embodiments, a first exterior layer 118 may be formed along an opposite surface of the interior structure 142. Although non-limiting, the tear element 135 may extend between first and second ends 121, 123 of the magnetic stripe 103. In some embodiments, a free end 144 of the tear element 135 may continue past the first and/or second ends 121, 123 of the magnetic stripe 103 to permit a user to grasp the tear element 135. The free end 144 of the tear element 135 may be secured to the first main side 106, the second main side 108, and/or the side surface 109 by a removable component (not shown), such as an adhesive sticker or tab. The removable component may be subsequently removed by a user to lift the free end 144 of the tear element 135 from the body 104.

Figure 5:
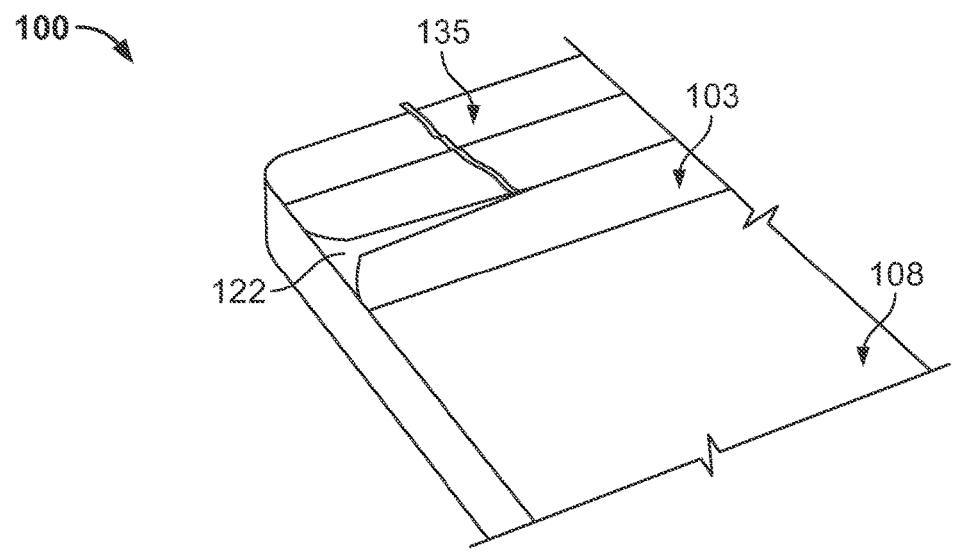
FIG. 5 is a perspective view of the transaction card of FIG. 1 during removal of a tear strip, in accordance with embodiments of the present disclosure.

As demonstrated in FIG. 5, continued pulling on the tear element 135 away from the second main side 108 causes the tear element to break through the magnetic stripe 103. Removing the tear element 135 away from the second main side causes destruction to the magnetic stripe 103, rendering it unreadable. The user may continue to pull the tear element 135 until the tear element 135 and the tear element 135 has traversed an entire length of the magnetic stripe 103. The user is then free to discard or destroy the card 100 with increased confidence that his/her personal information is not easily readable via the magnetic stripe 103.

Referring again to FIG. 2, the first main side 106 of the card 100 may include the first exterior layer 118 containing identifying indicia, such as an account holder name 117 and/or a card number 119. Although non-limiting, the card number 119 may be a 16-digit number (e.g., four groups of four digits). In other embodiments, the card number 119 may include a different number of digits. The identifying indicia may be printed over/on the first exterior layer 118. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

As further shown, the identification chip 102 may be coupled (e.g., recessed or partially embedded) to the first main side 106 of the card 100. As used herein, the identification chip 102 may be any microprocessor device configured to exchange data electromagnetically, such as a RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

Figure 6:
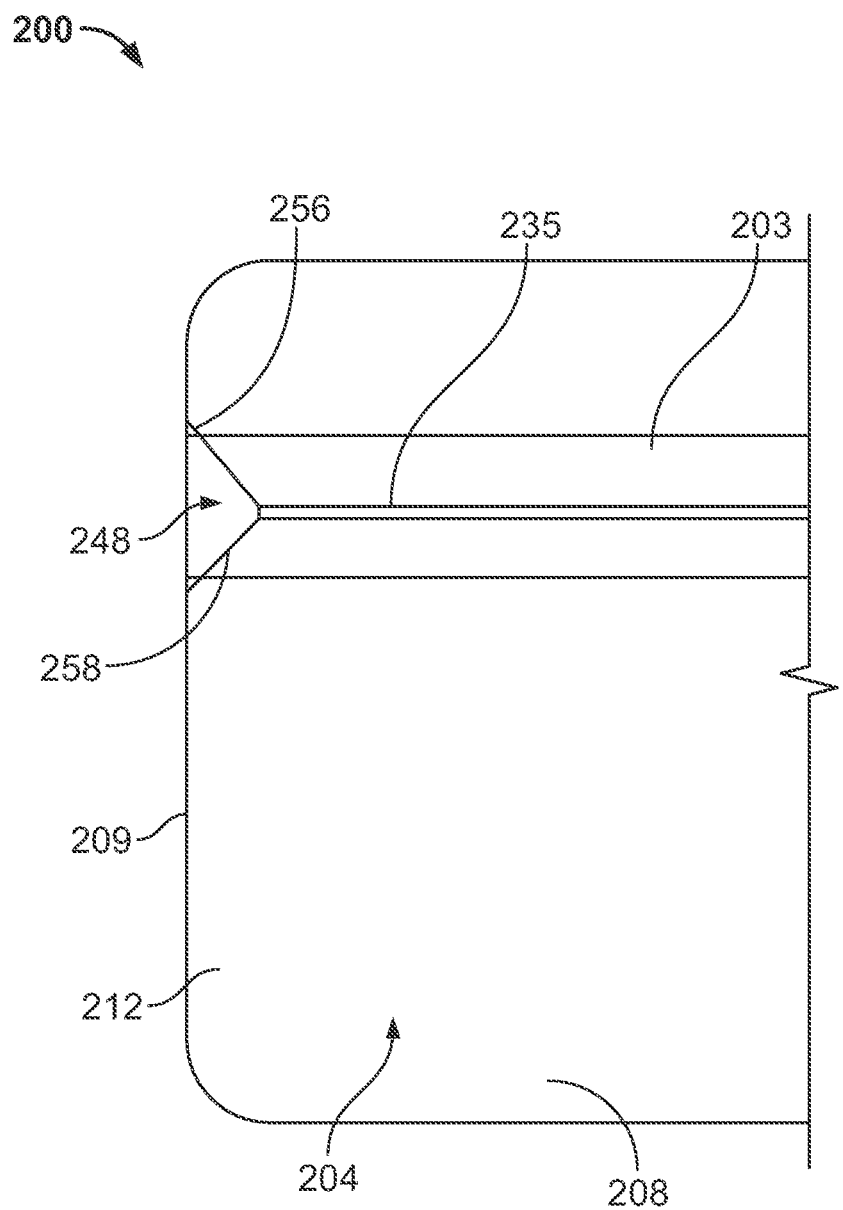
FIG. 6 is a bottom/back view of a portion of a transaction card, in accordance with embodiments of the present disclosure.

FIG. 6 demonstrates a card 200 according to another embodiment of the present disclosure. The card 200 may be the same or similar to the card 100 described herein. As such, only certain aspects of the card 200 will hereinafter be described for the sake of brevity. In this embodiment, the card 200 may include a body 204 having a removable component 248, such as a pull tab. The removable component 248 may be coupled to a tear element 235, which extends beneath a magnetic stripe 203. In some embodiments, the removable component 248 may include a portion of the magnetic stripe 203.

As shown, the removable component 248 may be planar with a side surface 209 at a second end 212 of the body 204 so as to maintain an overall shape and/or profile of the body 204. Furthermore, a top surface of the removable component 248 may be generally planar with a second main side 208 of the body 204 to ensure the removable component 248 does not interfere with reading of the magnetic stripe 203 during use. In some embodiments, the removable component 248 may extend through an entire thickness of the body 204 of the card 200, e.g., between a front and back side thereof. In other embodiments, the removable component 248 may extend only partially through the body 204.

To remove the tear element 235, the removable component 248 may first be separated from the body 204. In some embodiments, the removable component 248 has one or more support tabs separated by gaps (not shown) along a first side 256 and/or a second side 258 thereof. Bending or twisting of the removable component 248 may cause the support tabs to break, thus freeing the removable component 248. A user may then continue to pull the removable component 248 away from the second main side 206 until the tear element 235 breaks through the magnetic stripe 203.

Figure 7A:
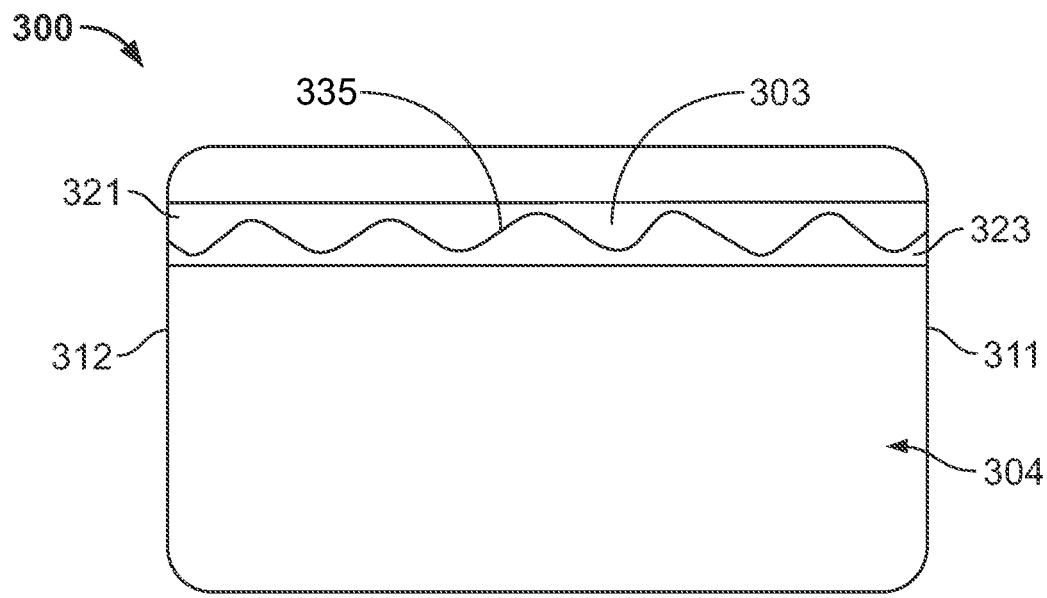
FIGS. 7A-7C are bottom/back views of various transaction cards, in accordance with embodiments of the present disclosure.
Figure 7B:
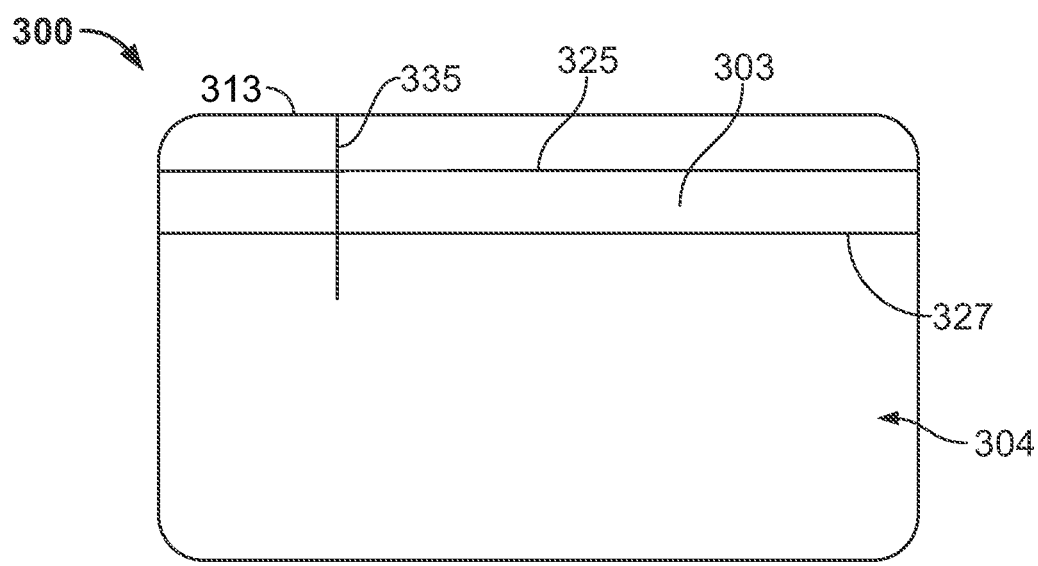
Figure 7C:
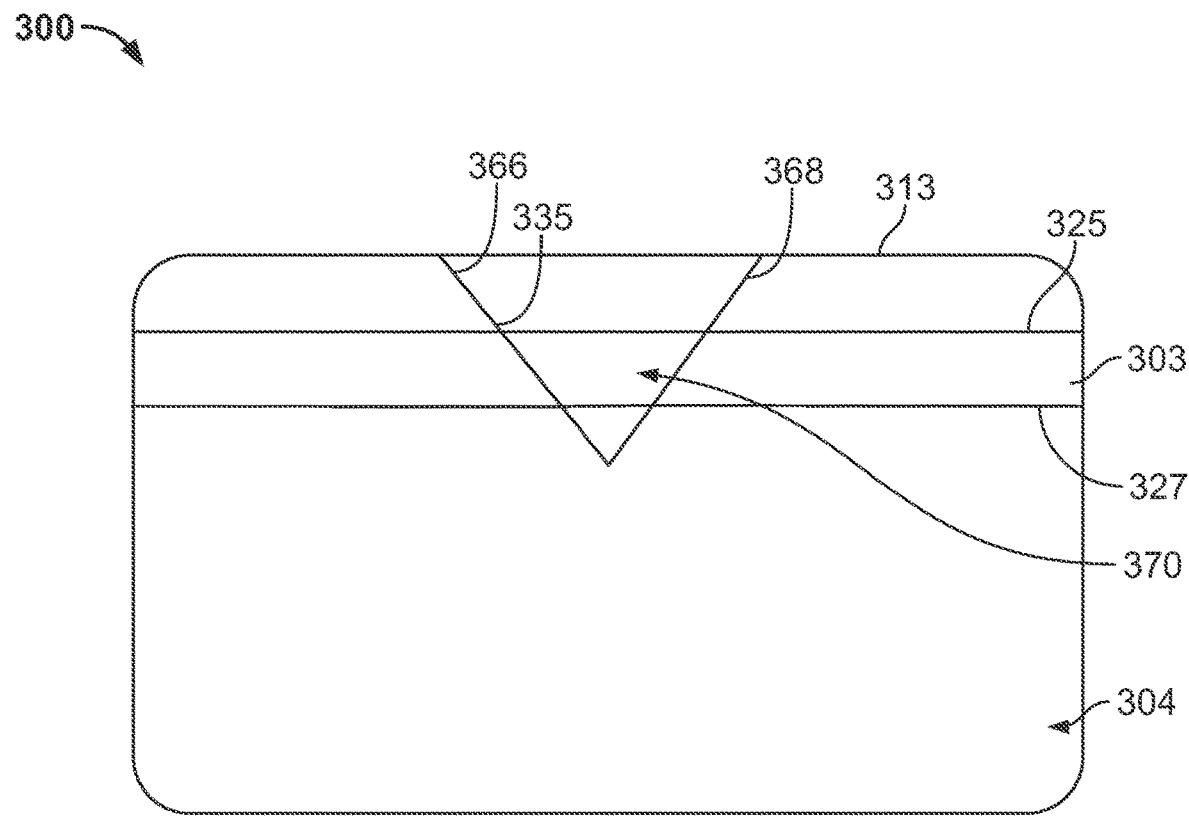

FIGS. 7A-7C demonstrate a card 300 with alternative tear element arrangements according to various embodiments of the present disclosure. The card 300 may be the same or similar to the cards 100 and 200 described herein. As such, only certain aspects of the card 300 will hereinafter be described for the sake of brevity. As demonstrated in FIG. 7A, a tear element 335 may extend between first end second ends 321, 323 of a magnetic stripe 303 in a wavy or undulating configuration. As shown, the tear element 335 generally extends between first and second ends 311, 312 of a body 304 of the card 300. The undulating configuration may result in a more complete deactivation of the magnetic stripe 303.

In FIGS. 7B-7C, the tear element 335 may extend between a first side 325 and a second side 327 of the magnetic stripe 303. As further shown, the tear element 335 may extend to a perimeter along a first side 313 of the body 304. In the embodiment of FIG. 7C, the tear element 335 may include a first end 366 originating along the first side 313 and a second end 368 terminating along the first side 313. As the tear element 335 is pulled, the tear element 335 may break through the magnetic stripe 103 in two areas. In some embodiments, a section 370 of the magnetic stripe 103 and a section 372 of a second exterior layer of the card 300 may be removed from the body 304 for increased destruction of the magnetic stripe 303. To accomplish this, the tear element 335 may be located beneath the second exterior layer 322. In other embodiments, the tear element 335 may be partially exposed along an outer surface of the second exterior layer 322 until the tear element 335 passes beneath the magnetic stripe 303. It will be appreciated that alternative configurations for the tear element 335 are possible.

Figure 8:
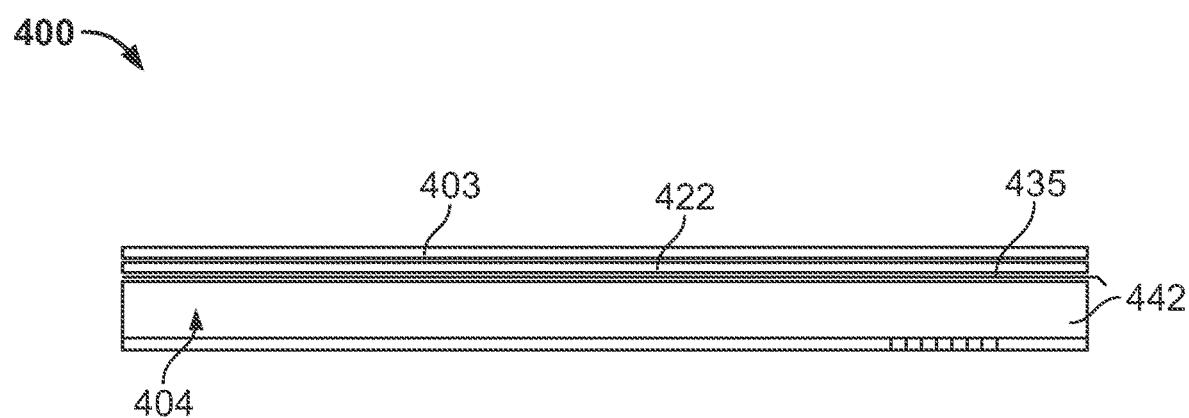
FIG. 8 is a side cross-sectional view of a transaction card, in accordance with embodiments of the present disclosure.

A card 400 of FIG. 8 further demonstrates may include a tear element 435 disposed between a second exterior layer 422 and an interior structure 442 of a body 404. The tear element 435 may be beneath a magnetic stripe 403, which is disposed along the second exterior layer 422. As the tear element 435 is pulled, the tear element 435 may break through both the second exterior layer 422 and the magnetic stripe 403. Although not shown, the second exterior layer 422 may include one or more thinned/weakened areas, cuts, holes, etc., beneath the magnetic stripe 403 to enable the tear element 435 to more easily break through.

Turning now to FIG. 9, a method 500 for according to embodiments of the disclosure will be described in greater detail. At block 501, the method 500 may include providing a body of a transaction card, the body including an interior structure. In some embodiments, the body includes a first main side opposite a second main side. In some embodiments, the body includes a first end opposite a second end, and a first side opposite a second side. In some embodiments, the transaction card may be a credit or debit card, a RFID passport, or an access card. The transaction card may include multiple layers each having one or more functions.

At block 503, the method 500 may include providing an exterior layer over the interior structure, wherein the exterior layer includes a magnetic stripe. The magnetic stripe may include a first end opposite a second end, and a first side opposite a second side. The first and second ends of the magnetic stripe may generally extend between the first and second sides of the body of the card.

At block 505, the method 500 may include providing a tear element between the magnetic stripe and the interior structure. In some embodiments, the tear element may be string, cord, line, etc., formed along a surface of the interior structure of the body. In some embodiments, the tear element may be formed along an outer surface of the exterior layer such that the tear element is sandwiched between the magnetic stripe and the exterior layer. In some embodiments, the tear element may extend between the first and second ends of the magnetic stripe. In some embodiments, the tear element may extend between the first and second sides of the magnetic stripe. In some embodiments, the method may include further connecting the tear element to a removable component, wherein the removable component is separable from the body of the transaction card.

In some embodiments, the method may include coupling an identification chip to the first main side of the body. In some embodiments, the identification chip may be any microprocessor device configured to exchange data electromagnetically, such as a RFID chip. The identification chip may include a radio frequency inductor, volatile or non-volatile memory storage, a microprocessor, circuitry logic, and/or an antenna.

At block 507, the method 500 may optionally include separating one or more portions of the magnetic stripe from the interior structure by drawing the tear element away from the second main side of the body. In some embodiments, the tear element is drawn between the first and second sides of the magnetic stripe. In some embodiments, the tear element may be configured as a series of undulations along the length of the magnetic stripe.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g. epoxies, polyurethanes, polyimides), their form (e.g. paste, liquid, film, pellets, tape), their type (e.g. hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary. Although non-limiting, the card 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, although the illustrative method 500 is described above as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 500 may be implemented in association with the formation and/or processing of structures illustrated and described herein as well as in association with other structures not illustrated.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:

a body including an interior structure;

an exterior layer attached to the interior structure, the exterior layer including a magnetic stripe; and a tear element disposed between the magnetic stripe and the interior structure, wherein the tear element is operable to tear the magnetic stripe when the tear element is moved away from the body, and wherein the tear element is a flexible tear strip.

2. The transaction card of claim 1, wherein the magnetic stripe includes a first end opposite a second end, and wherein the tear element extends between the first end and the second end of the magnetic stripe.

3. The transaction card of claim 2, wherein the tear element extends in an undulating configuration between the first end and the second end.

4. The transaction card of claim 1, wherein the magnetic stripe includes a first side opposite a second side, and wherein the tear element extends between the first side and the second side of the magnetic stripe.

5. The transaction card of claim 1, the body comprising a first main side connected to a second main side by a side surface, wherein an identification chip is coupled to the first main side of the body, and wherein the magnetic stripe is disposed along the second main side.

6. The transaction card of claim 5, wherein the tear element extends along the second main side of the body.

7. The transaction card of claim 5, wherein the tear element is sandwiched between the exterior layer and the magnetic stripe.

8. The transaction card of claim 1, the body further comprising a removable component coupled to the body, the removable component coupled to the tear element.

9. The transaction card of claim 8, wherein the removable component is coupled to a free end of the tear element.

10. A transaction card, comprising:
a body including a first main side opposite a second main side;
an exterior layer along the second main side, the exterior layer including a magnetic stripe; and
a flexible tear strip disposed between the magnetic stripe and an interior structure of the body, wherein the tear strip is operable to tear through the magnetic stripe when the tear strip is moved away from the body.

11. The transaction card of claim 10, wherein the tear strip extends between a first end and a second end of the magnetic stripe.

12. The transaction card of claim 11, wherein the tear strip extends in an undulating configuration between the first end and the second end.

13. The transaction card of claim 10, wherein the magnetic stripe includes a first side opposite a second side, and wherein the tear strip extends between the first side and the second side of the magnetic stripe.

14. The transaction card of claim 10, wherein the tear strip extends along the second main side and the first main side.

15. The transaction card of claim 10, the body further comprising a removable component coupled to the body, the removable component coupled to a free end of the tear strip.

16. The transaction card of claim 15, wherein the magnetic stripe is formed over the exterior layer, wherein the tear strip is sandwiched between magnetic stripe and the exterior layer.

17. A method, comprising:
providing a body of a transaction card, the body including an interior structure;
providing an exterior layer over the interior structure, wherein the exterior layer includes a magnetic stripe; and
providing a tear element between the magnetic stripe and the interior structure, wherein the tear element is a flexible tear strip.

18. The method of claim 17, further comprising connecting the tear element to a removable component, wherein the removable component is separable from the body.

19. The method of claim 17, further comprising separating one or more portions of the magnetic stripe from the interior structure by drawing the tear element between a first end and a second end of the magnetic stripe.

20. The method of claim 19, further comprising arranging the tear element in an undulating configuration between the first end and the second end of the magnetic stripe.

* * * * *